United States Patent
Le Van Gong et al.

(10) Patent No.: US 11,985,254 B2
(45) Date of Patent: May 14, 2024

(54) THRESHOLD MULTI-PARTY COMPUTATION WITH MUST-HAVE MEMBER

(71) Applicant: PAYPAL, INC., San Jose, CA (US)

(72) Inventors: Hubert Andre Le Van Gong, San Jose, CA (US); Khai Hanh Tang, Singapore (SG); Shanshan Hua, Singapore (SG); Siew Hoon Lim, Singapore (SG)

(73) Assignee: PayPal, Inc., San Jose, CA (US)

( * ) Notice: Subject to any disclaimer, the term of this patent is extended or adjusted under 35 U.S.C. 154(b) by 424 days.

(21) Appl. No.: 17/459,178

(22) Filed: Aug. 27, 2021

(65) Prior Publication Data
US 2023/0066582 A1    Mar. 2, 2023

(51) Int. Cl.
*H04L 9/32*     (2006.01)
*G06Q 20/38*    (2012.01)
*H04L 9/08*     (2006.01)
*H04L 9/30*     (2006.01)

(52) U.S. Cl.
CPC ......... *H04L 9/3247* (2013.01); *G06Q 20/389* (2013.01); *H04L 9/085* (2013.01); *H04L 9/30* (2013.01); *G06Q 2220/00* (2013.01); *H04L 2209/46* (2013.01); *H04L 2209/56* (2013.01)

(58) Field of Classification Search
CPC .......... H04L 9/3247; H04L 9/085; H04L 9/30
See application file for complete search history.

(56) References Cited

U.S. PATENT DOCUMENTS

| | | | | |
|---|---|---|---|---|
| 7,386,131 | B2* | 6/2008 | Jing | H04L 9/0827 380/278 |
| 2002/0129087 | A1* | 9/2002 | Cachin | H04L 63/12 709/200 |
| 2007/0223706 | A1* | 9/2007 | Gantman | G06F 21/602 380/286 |
| 2010/0037055 | A1* | 2/2010 | Fazio | H04L 9/3255 713/171 |
| 2019/0058581 | A1* | 2/2019 | Wood | G06F 16/27 |
| 2023/0319103 | A1* | 10/2023 | Pettit | H04L 63/1458 713/176 |

OTHER PUBLICATIONS

Yehuda Lindell et al.; Fast Secure Multiparty ECDSA with Practical Distributed Key Generation and Applications to Cryptocurrency Custody; Oct. 14, 2018; pp. 1-50.

* cited by examiner

*Primary Examiner* — William S Powers
(74) *Attorney, Agent, or Firm* — Haynes and Boone, LLP

(57) ABSTRACT

Methods and systems are presented for providing a secured framework for facilitating electronic transactions using a multi-party computation approach. Under the multi-party computation approach, the task of authenticating a transaction conducted through a user account is distributed among multiple computer nodes. One or more secrets and shares of a secret are distributed among the multiple computer nodes. An authentication process is implemented such that at least a portion of the multiple computer nodes, including one or more required nodes, exceeding a predetermined number of nodes are needed to perform a set of computations using the corresponding secret(s) and/or shares of the secret in order to generate a digital signature for the user account. By verifying the digital signature using a public key of the user account, it can be determined that the participation requirement has been satisfied.

20 Claims, 7 Drawing Sheets

THRESHOLD MULTI-PARTY COMPUTATION WITH MUST-HAVE MEMBER

BACKGROUND

The present specification generally relates to distributed computing, and more specifically, to providing a framework for secured multi-party computation according to various embodiments of the disclosure.

RELATED ART

With the advent of computer technologies and device networking capabilities, a variety of transactions can now be performed electronically. For example, through a mobile device, a user may conduct electronic transactions, such as transferring of funds or cryptocurrency transactions, etc., by performing a few simple steps through the mobile device (e.g., entering account credentials such as a user name and a password, etc.). However, the ease of performing such transactions and the network accessibility of certain sensitive information such as passwords may enable malicious persons to access user accounts and conduct malicious activities through those user accounts. In some instances, a malicious person may gain control of a user device of a user (e.g., a mobile device of the user, a home personal computer that is connected to the Internet, etc.) or a server that performs the electronic transactions by hacking into the device or obtaining physical possession of the device. The malicious person may then use the user device or the server to conduct fraudulent transactions through the user account of the user. In other instances where the account credentials or other sensitive data is stored on a networked computer, the malicious person may illegally obtain the sensitive data (e.g., through various hacking mechanisms, etc.), and may access the user account to perform fraudulent transactions using the illegally obtained data. Thus, there is a need for improving the security of electronic transactions.

Figure 1:
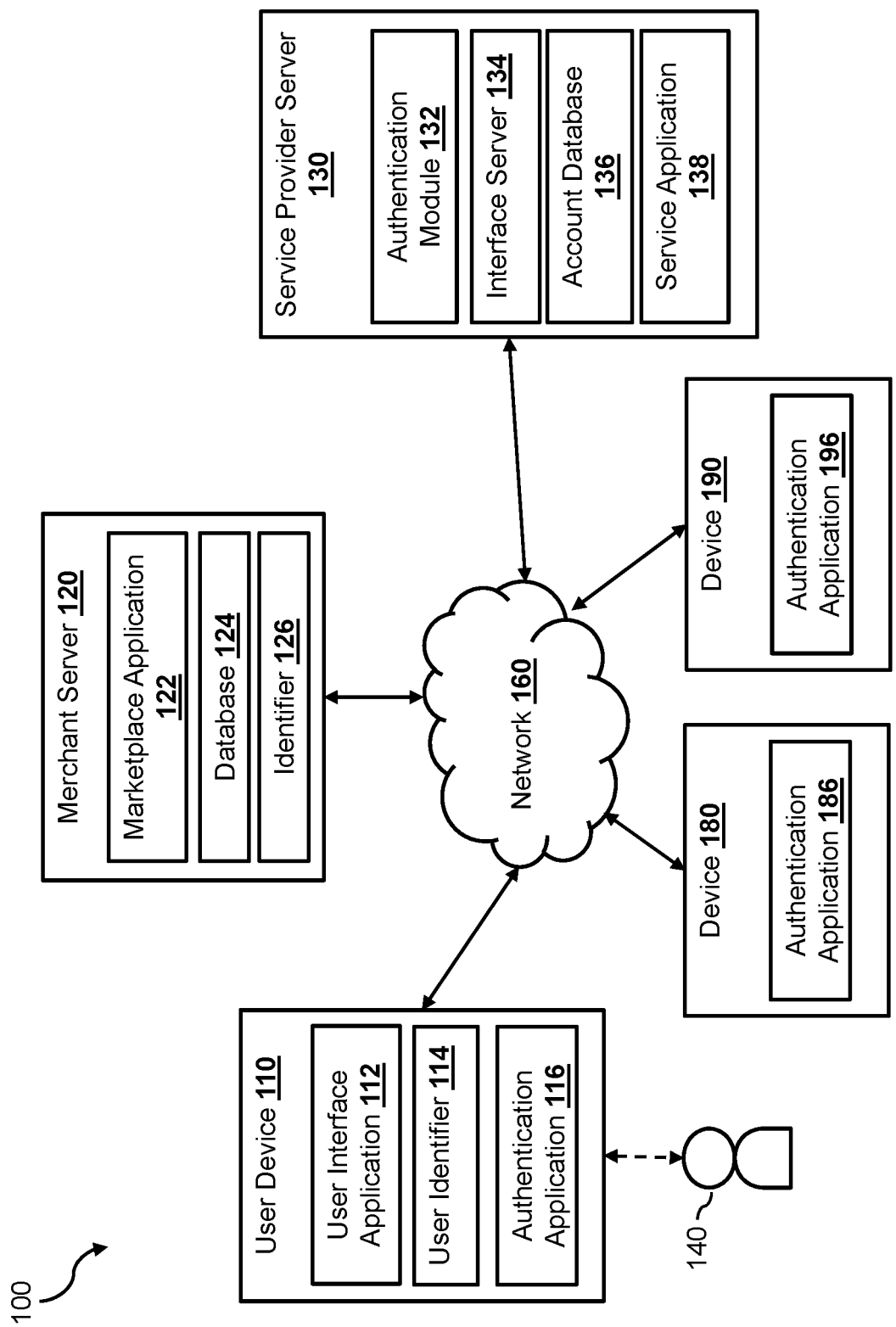
FIG. 1 is a block diagram illustrating a networked system that includes an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for providing a secured framework for facilitating electronic transactions using a multi-party computation approach. As discussed above, the ease of conducting transactions electronically has enabled malicious users to perform fraudulent transactions via user accounts of legitimate users. Service providers that facilitate electronic transactions for users have spent enormous effort in preventing the performance of fraudulent transactions. In some embodiments, to prevent fraudulent transactions, a service provider may adapt an authentication process to authenticate a transaction (e.g., determining whether the transaction is a legitimate transaction or a fraudulent transaction) prior to processing the transaction. The authentication process can be complex, and may involve a number of factors such as account credentials used to access the user account, a location of a device used to conduct the transaction, transaction patterns associated with the user account, and other factors. The service provider may then process the transaction only when it is determined that the transaction is a legitimate transaction.

While such an authentication process may reduce the number of fraudulent transactions, it still has many weaknesses that can be exploited by malicious users. For example, as discussed above, a conventional authentication process often depends on functionalities and/or actions performed by one or more devices (e.g., the user device used to initiate the transaction, the service provider server used by the service provider to perform the authentication process, etc.) such that the authentication process would be breached if any one of the one or more devices are taken over (e.g., through one or more computer hacking mechanisms, etc.). These single potential points of attack (e.g., the user device, the service provider server, etc.) can easily be exploited by the malicious users to further their fraudulent activities through user accounts with the service provider.

Thus, according to various embodiments of the disclosure, the service provider may use a secured multi-party computation framework for authenticating electronic transactions. The multi-party computation framework requires that multiple computer nodes collaborate to perform a set of computations in order to authenticate an electronic transaction. By requiring multiple computer nodes to collaborate in the authentication process, the risk of breaching the authentication process based on a single point of attack can be eliminated. An authentication system of the service provider may first determine the multiple computer nodes that would be used in the authentication process. In some embodiments, the authentication system may determine servers associated with the service provider (e.g., various servers located in different geographical regions) to be included as part of the multiple computer nodes involved in the authentication process for authenticating transactions, such that no single point of attack at any one server would breach the authentication process. In some embodiments, the authentication system may further determine one or more third-party servers (e.g., servers that are not associated with the service provider) to be included as part of the multiple computer nodes involved in the authentication process. The inclusion of third-party servers in the authentication process further enhances security of the authentication process as the third-party servers are not intimately connected with the service provider servers via a network.

In some embodiments, the authentication system may further determine one or more user devices associated with a user to be included as part of the multiple computer nodes involved in the authentication process for authenticating transactions with a user account of the user. The inclusion of user devices associated with the user in the authentication process further enhances the security of the authentication process as it provides the user additional control over the authentication of transactions through the user's account. Thus, different sets of computer nodes may be determined for different accounts. The user device(s) may include devices operated by the user (e.g., a mobile device of the user, a home computer of the user, etc.) and/or devices operated by other persons associated with the user (e.g., a user device of an employee of the user, a user device of a family member of the user, etc.).

Different approaches may be used to implement the multi-party computation framework. Under a first multi-party computation approach, each and every one of the multiple computer nodes is required to participate in the authentication process in order to authenticate a transaction through a user account. In some embodiments, to authenticate a transaction conducted through a user account, each of the multiple computer nodes is required to collaborate with each other to generate a digital signature corresponding to the user account. For example, a secret can be generated for producing the digital signature corresponding to the user account. Shares or portions of the secret may then be distributed among the multiple computer nodes, where each computer node possesses a distinct share (which may include one or more portions of the secret). During the authentication process, each of the multiple computer nodes may be required to collaborate in generating the digital signature by performing a computation using its corresponding share(s) of the secret. The digital signature is then verified in order for the transaction to be authenticated. However, the first multi-party computation approach has a disadvantage in that a failure of any one computer node (e.g., the computer node is down, a network connectivity issue with the computer node, etc.) may cause a breakdown in the authentication process. Thus, while the first multi-party computation approach is secure, it is not resilient.

To improve the resiliency of the multi-computation framework, a second multi-party computation approach may be used. Under the second multi-party computation approach, instead of requiring every one of the multiple computer nodes to participate in generating the digital signature, only a portion of the multiple computer nodes (more than one but less than the total number of computer nodes) is required in the collaboration to generate the digital signature for the user account. The number of computer nodes required to participate in the authentication process to generate the digital signature may be denoted as t while the total number of computer nodes in the multiple computer nodes may be denoted as n. For example, shares of the secret may be distributed among the multiple computer nodes (the n number of computer nodes) in a manner such that any combination of the shares possessed by a predetermined number (t) of computer nodes (e.g., more than one but less than the total number of computer nodes in the multiple computer nodes) is sufficient to generate the digital signature. This way, the authentication process is more resilient to computer node failures as the unavailability of a small number of computer nodes would not otherwise prevent a transaction from being authenticated. By adjusting the number of computer nodes (t) required to generate the digital signature, the authentication system may modify the security and resiliency characteristics of the authentication process.

Using the second multi-party computation approach, the authentication system may strike a balance between security and resiliency by adjusting the number of computer nodes (t) required to generate the digital signature, as discussed herein. However, the second multi-party computation approach still has its shortcomings. For example, while the authentication system may increase the security by increasing the number of computer nodes (t) required to generate the digital signature, the authentication system cannot require any particular computer node to participate in the authentication process using the second multi-party computation approach. When most of the computer nodes involved in the authentication process are not under the control of the user (e.g., the service provider servers, the third-party servers, etc.), the user may feel that he/she does not have sufficient control over the authentication process.

Thus, according to various embodiments of the disclosure, a third multi-party computation approach may be used to implement the multi-party computation framework. Under the third multi-party computation approach, the authentication system may select one or more "must-have" or required computer nodes for performing the authentication process. As such, to perform an authentication process for a transaction conducted through a user account, at least t number of computer nodes, including the one or more required computer nodes selected for the user account, within the multiple computer nodes are required to generate the digital signature corresponding to the user account. To implement such an authentication process under the third multi-party computation approach, multiple secrets may be generated for the digital signature in a manner such that the combination of the multiple secrets are required to generate the digital signature. The number of secrets generated may correspond to one plus the number of required computer nodes for authenticating transactions conducted through the user account. For example, if only one required computer node is needed for the authentication process, two secrets may be generated for generating the digital signature. If two required computer nodes are needed for the authentication process, three secrets may be generated for generating the digital signature.

As discussed herein, the combination of all of the secrets are required to generate the digital signature. Thus, the authentication system may distribute one or more of the secrets (the unshared secrets) among the one or more required computer nodes. The authentication system may then generate shares from the remaining secret (the shared secret) using techniques disclosed herein (e.g., using the same technique according to the second multi-party computation approach), and distribute the shares associated with the shared secret to the other remaining computer nodes (the multiple computer nodes excluding the required nodes). In some embodiments, the authentication system may generate the shares from the shared secret and distribute the shares to the remaining multiple computer nodes such that shares from any combination of a number of computer nodes equals to t minus the number of required nodes are needed to generate an output that mimics a computation based on the shared secret. In some embodiments, the output may be the shared secret. In some embodiments, the output may mimic a product generated based on the shared secret.

Accordingly, during an authentication process for authenticating a transaction conducted through a user account under the third multi-party computation approach, a set of computer nodes not including the required node(s) may collaborate in performing a set of computations using their corresponding shares to generate the shared secret or a product based on the shared secret. If a sufficient number of computer nodes (t minus the number of required nodes) participate in the authentication process, the set of computer nodes would successfully generate an output that corresponds to the shared secret (e.g., the shared secret or an output the mimics a product generated by the shared secret) using their corresponding shares. The required node(s) may then perform additional computations on the output using the corresponding secret(s) to generate the digital signature. Thus, using the third multi-party computation approach, a transaction conducted through a user account would not be authenticated without participation by any one of the required node(s) or without a quorum of computer nodes (t number of computer nodes).

In some embodiments, the authentication system may determine, among available computer nodes that can be used to participate in the authentication process for a user account, one or more required nodes based on a set of criteria. For example, the authentication system may determine that at least one user device associated with the user of the user account is a required node for the user account. The authentication system may also determine that a server (e.g., a service provider server, a third-party server, etc.) is a required node based on attributes of the servers, such as an entity that has control of the server (e.g., is the server under the control of the user, is the server under the control of a legal representative such as a lawyer, a trust, or a notary of the user, etc.), location attributes representing attributes of the physical locations of the servers (e.g., a geographical location, whether the server is in secured premise, etc.), computer attributes of the server (e.g., hardware or software components that contribute to the security of the servers), and other factors.

In some embodiments, the authentication system may initially determine that only a particular user device (e.g., a mobile device) of the user is the required node for authenticating transactions conducting through the user account. The authentication system may then analyze attributes of the particular user device, such as locations that the particular user device has been associated with in the past, hardware and/or software components (e.g., a device model, an operating system, installed software applications, etc.) of the particular user device. If it is determined that the particular user device is above a risk level based on the analysis, the authentication system may determine one or more additional devices (e.g., an additional user device associated with the user, a server, etc.) as required devices for the authentication process.

After determining the required nodes, the authentication system may then generate a number of secrets (e.g., unshared secret(s) and a shared secret) and distribute the unshared secret(s) and shares associated with the shared secret among the computer nodes, where the unshared secret(s) are distributed among the required node(s) and the shares are distributed among the remaining computer nodes.

FIG. 1 illustrates a networked system 100, within which the authentication system may be implemented according to one embodiment of the disclosure. Note that the present techniques may be applied in many different computing and technological environments, however, and are not limited to those shown in the figures. The networked system 100 includes a service provider server 130, a merchant server 120, user devices 110, and devices 180 and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. The user 140 may be a natural person or an entity (e.g., a corporation, a partnership, an organization, etc.). For example, the user 140 may use the user device 110 to conduct an online transaction with the merchant server 120 via websites hosted by, or mobile applications associated with, the merchant server 120. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130, and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110 may include an authentication application 116 that implements at least a portion of the authentication system disclosed herein. In the scenario where the user device 110 is selected as one of the computer nodes for performing the authentication process as disclosed herein, the authentication application 116 may be configured to receive a secret or share(s) associated with a secret (e.g., from the service provider server 130), and to store the secret or the share(s) associated with the secret in a data storage of the user device 110. Upon receiving an authentication request (e.g., from the service provider server 130), the authentication application 116 may be configured to perform an authentication routine (e.g., a set of computations using the secret or the share(s) associated with the secret) to produce an output. The authentication application 116 may then transmit the output back to the service provider server 130 and/or other computer nodes involved in the authentication process. In some embodiments, the authentication routine performed by the authentication application 116 may be based (e.g., dependent) on another output generated by another computer node performing an authentication routine corresponding to the other computer node.

The user device 110, in one embodiment, may include at least one identifier 114, which may be implemented, for example, as operating system registry entries, cookies associated with the user interface application 112 and/or the authentication application 116, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account (e.g., and a particular profile) maintained by the service provider server 130.

In various implementations, the user 140 is able to input data and information into an input component (e.g., a keyboard) of the user device 110. For example, the user 140 may use the input component to interact with the UI application 112 (e.g., to retrieve content from third-party servers such as the merchant server 120, to provide inputs related to a goal to the service provider server 130, etc.).

While only one user device 110 is shown in FIG. 1, it has been contemplated that multiple user devices, each associated with a different user account with the service provider server 130, may be connected to the user device 110, the merchant server 120, and the service provider server 130 via the network 160.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for viewing, accessing, and/or purchasing, and process payments for the purchases. As shown, the merchant server 120 may include a merchant database 124 for identifying available items, which may be made available to the user device 110 for viewing and purchase by the user.

The merchant server 120, in one embodiment, may include a marketplace application or server 122, which may be configured to provide information (e.g., displayable content) over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for access and/or purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

The service provider server 130, in one embodiment, may be maintained by a transaction processing entity or an online service provider, which may provide processing for electronic transactions between the users of the user device 110 and one or more merchants or other types of payees. As such, the service provider server 130 may include a service application 138, which may be adapted to interact with the user device 110, and/or the merchant server 120 over the network 160 to facilitate the searching, selection, purchase, payment of items, transaction authentication, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130. The interface server 134 may also include other electronic pages associated with the different services (e.g., electronic transaction services, etc.) offered by the service provider server 130. As a result, a user (e.g., the user 140, users of the user devices 180 and 190, or a merchant associated with the merchant server 120, etc.) may access a user account associated with the user and access various services offered by the service provider server 130 (e.g., conduct various transactions such as payment transactions, data access transactions through a user account of the user), by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110, etc.) and merchants. In one implementation, a user may have credentials to authenticate or verify identity with the service provider server 130. Thus, the service provider server may store the credentials of the users in corresponding records of the account database 136 associated with the user accounts.

In various embodiments, the service provider server 130 includes an authentication module 132 that implements at least a portion of the authentication system as discussed herein. The authentication module 132 may be configured to perform and facilitate an authentication process for authenticating electronic transactions conducted through various user accounts with the service provider server 130. In some embodiments, the authentication module 132 may implement the authentication process using a multi-party computation framework as discussed herein. As such, the authentication module 132 may, for each user account (e.g., the user account associated with the user 140), select a set of computer nodes for performing the authentication process in collaboration. The set of computer nodes may include a user device associated with the user account (e.g., the user device 110), one or more user devices that are not associated with the user account (e.g., a device associated with an agent, an employee, a family member, a colleague of the user 140, etc.) one or more servers associated with the service provider (e.g., the service provider server 130), one or more third-party servers that are not associated with the service providers (e.g., the merchant server 120 or other servers associated with a third-party entity).

In some embodiments, the authentication module 132 may be configured to select different sets of computer nodes for the authentication process associated with different user accounts. In one example, the authentication module 132 may select the user device 110, the service provider server 130, the device 180, and the device 190 as the set of computer nodes for performing the authentication process for the user account associated with the user 140. The authentication module 132 may select another set of devices (e.g., another user device, another third-party server device, etc.) for another user account. The devices 180 and 190 may include another user device associated with the user 140, a user device not associated with the user 140 (e.g., a user device of an agent, an employee, a family member of the user 140), another service provider server associated with the service provider, and/or a third-party server associated with a third-party entity. As shown, each of the devices 180 and 190 includes an authentication application (e.g., the authentication application 186 of the device 180, and the authentication application 196 of the device 190) that is similar to the authentication application 116. Each of the authentication applications 186 and 196 may perform a corresponding authentication routine for the corresponding device using one or more secrets or one or more shares associated with a secret stored in the corresponding device. Through collaborations among the set of computer nodes, the authentication module 132 may authenticate transactions conducted through the user device.

Figure 2:
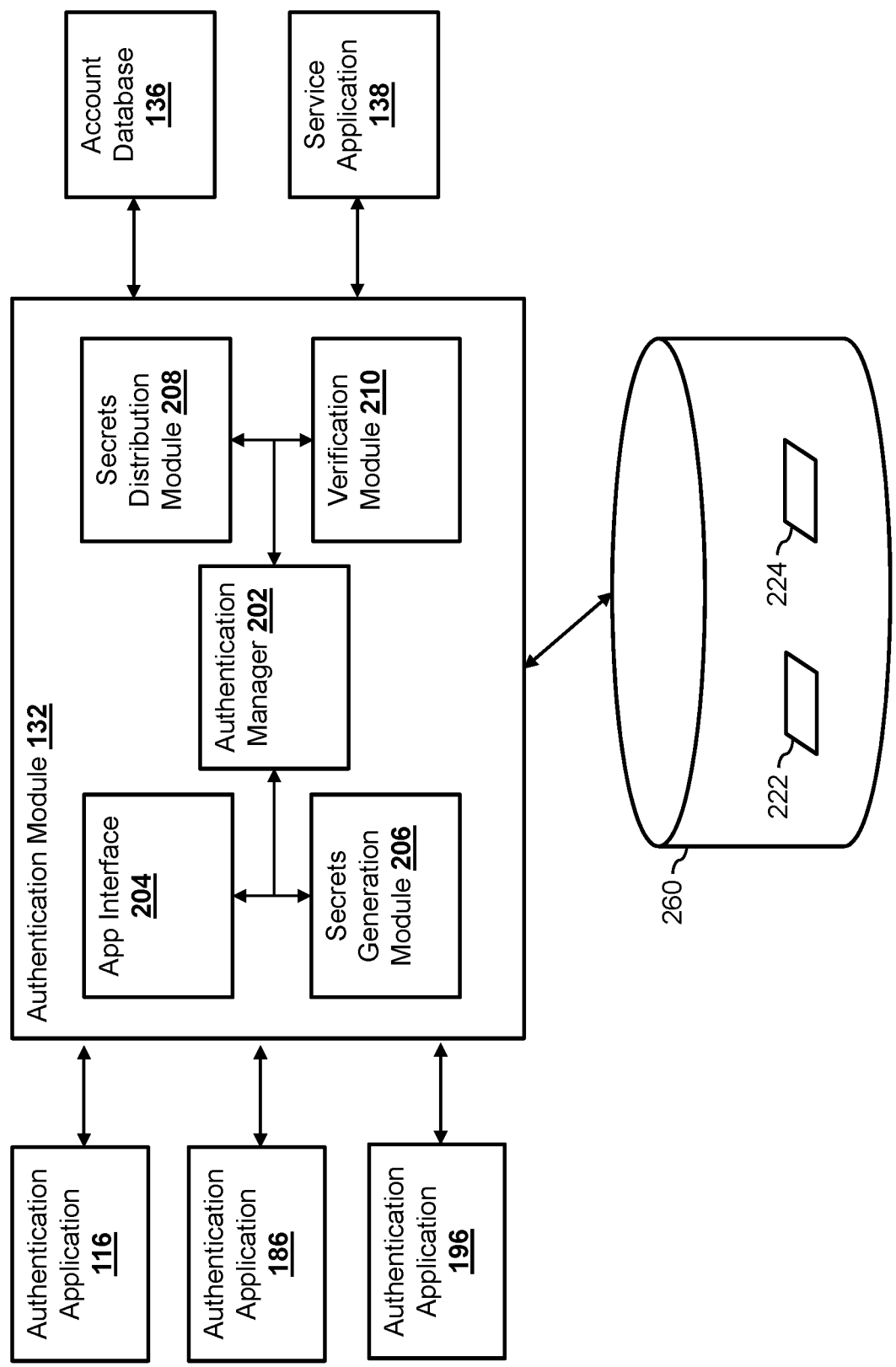
FIG. 2 is a block diagram illustrating an authentication module according to an embodiment of the present disclosure.

FIG. 2 illustrates a block diagram of the authentication module 132 according to an embodiment of the disclosure. The authentication module 132 includes an authentication manager 202, an application interface 204, a secrets generation module 206, a secrets distribution module 208, and a verification module 210. In some embodiments, the authentication module 132 may be communicatively coupled to the authentication applications 116, 186, and 196 of the user device 110, the device 180, and the device 190, respectively. The authentication module 132 may collaborate with the authentication applications 116, 186, and 196 to perform the authentication process as discussed herein.

The authentication manager 202 may generate (or otherwise obtain), for each user account with the service provider server 130, a pair of corresponding public key and private key. For example, the authentication manager 202 may generate a pair of corresponding keys, such as a public key 222 and private key 224, using an asymmetric cryptography algorithm for the user account of the user 140. The pair of public key 222 and private key 224 corresponds with each other in a way that data encrypted using the private key 224 can only be decrypted using the public key 222, and vice versa. The private key 224 may be kept private by the owner of the user account (the user 140), and not shared with anyone. The authenticity of a digital signature produced by a user of a user account (e.g., data that is encrypted using a private key 224 associated with the user account) can be verified by decrypting the digital signature using the corresponding public key 222 to restore the data in its unencrypted form.

Conventionally, the private key may be stored at a single device (e.g., the user device, the service provider server 130, etc.), and may be used to generate a digital signature for the user account for authenticating a transaction (by encrypting a piece of data using the private key). However, as discussed herein, storing the private key at a single device may not be sufficiently secured as it provides a potential single point of attack to the malicious users. As such, the secrets generation module 206 of some embodiments may be configured to generate a secret (and/or shares associated with a secret) that can be shared (e.g., distribute) among multiple devices (e.g., a set of computer nodes) for performing the authentication process, such that a successful attack on a single (or a few) devices would not compromise the authentication process.

Accordingly, in some embodiments, the authentication manager 202 may select, for each user account with the service provider server 130, a set of computer nodes for participating in the authentication process of the user account. For example, the authentication manager 202 may select, for the user account associated with the user 140, the user device 110, the service provider server 130, the device 180, and the device 190 to be included in the set of computer nodes for authenticating transactions conducted through the user account. As discussed herein, the authentication manager 202 may select different sets of computer nodes for different user accounts such that the set of computer nodes may include at least one device that is personalized for the user of the corresponding user account.

In some embodiments, the authentication manager 202 may implement the authentication process using the third multi-party computation approach as disclosed herein, such that only a portion (more than one but not all) of the set of computer nodes is required to authenticate a transaction conducted through the user account. As such, in addition to selecting the set of computer nodes for participating in the authentication process, the authentication manager 202 may also determine, for each user account, how many computer nodes (t) within the set of computer nodes (having n computer nodes) should be required. As discussed herein, the ratio between the number of computer nodes required to perform the authentication process (t) and the total number of computer nodes in the set of computer nodes (n) attribute to the security and resiliency of the authentication process for the user account. For a given set of computer nodes (n), a larger t would increase the security, but would reduce the resiliency, of the authentication process. Conversely, a smaller t would increase the resiliency, but would reduce the security, of the authentication process.

Thus, the authentication manager 202 may select the number of required nodes t based on factors such as a risk potential of the user account, such as an average amount and a frequency of transactions conducted through the user account, an impact of the transactions conducted through the user account (e.g., is the transaction involve currency or sensitive data, etc.), and other factors.

In addition to determining the number of required nodes t for authenticating a transaction for the user account, the authentication manager 202 may also determine one or more nodes, within the set of computer nodes, as "must-have" or required nodes for authenticating transactions conducted through the user account. In some embodiments, in order to authenticate a transaction conducted through the user account under the third multi-party computation approach, not only a quorum of nodes (e.g., a number of computer nodes that participate in the authentication process equal to or exceeding the required number of nodes t) is required, but the required node(s) must also be participating in the authentication process. The requirement of having the required node(s), in addition to the quorum, in the authentication process further enhances the security of the transactions, as any one of the required nodes alone has the power to deny a transaction. In some embodiments, the authentication manager 202 may determine the required nodes for the user account based on one or more factors such as whether a device has an intimate tie to the user account (e.g., a personal device of a user of the user account, etc.), whether a device is under the control of the user of the user account, whether a device has security features beyond a threshold, etc.

For example, the authentication manager 202 may determine that at least one user device associated with the user of the user account (e.g., the user device 110) is a required node for the user account. If the authentication manager 202 determines that a risk profile associated with the user account exceeds a threshold (or that a security profile of the user device 110 is below a threshold), the authentication manager 202 may determine additional required node(s) for the user account. For example, the authentication manager 202 may also determine that a server (e.g., the service provider server 130, a third-party server, etc.) is a required node based on attributes of the servers, such as an entity that has control the server (e.g., is the server under the control of the user, is the server under the control of a legal representative such as a lawyer, a trust, or a notary of the user, etc.), location attributes representing attributes of the physical locations of the servers (e.g., a geographical location, whether the server is in secured premise, etc.), computer attributes of the server (e.g., hardware or software components that contribute to the security of the servers), and other factors.

The requirements of a quorum and a required node can be implemented in different manners. For example, a centralized authoritative device (e.g., the service provider server) may include logic (e.g., computer programming code), that when executed, may determine whether a quorum of computer nodes, including the one or more required nodes, have participated in the authentication process. However, relying on the centralized authoritative device to perform such checking is counter-productive, as it exposes the centralized authoritative device to potential single point of attacks, which is what the multi-party computation framework is designed to prevent.

Thus, in some embodiments, the requirements of a quorum and required nodes are implemented in an algorithmic level, instead of in a device level. In other words, an algorithm may be designed and implemented to require a set of computation to be performed among the set of computer nodes such that anyone (e.g., any devices, and not limited to one centralized authoritative device) can determine whether the quorum and required nodes requirements are satisfied (a number of nodes that equal to or exceeds the required number of nodes, including the required node(s) have participated in the authentication process) based on an output from the set of computation. This way, if a number of nodes that satisfies the quorum requirement, including the required nodes, participated in the authentication process by performing the corresponding computations (e.g., the corresponding authentication routines), a correct output may be generated. On the other hand, if the number of nodes that does not satisfy the quorum requirement, or does not include all of the required nodes, participated in the authentication process by performing the corresponding computations (e.g., the corresponding authentication routines), an incorrect output (or no output) may be generated. In some embodiments, a correct output may correspond to a digital signature associated with the user account (e.g., a piece of data encrypted using a private key of the user account). While the actual private key may not be used in the computation (e.g., the authentication process), the output generated by the set of computations during the authentication process may mimic a digital signature generated by encrypting a piece of data using the private key of the user account.

To implement the algorithm, a number of secrets may be generated based on the number of required node(s). For example, if only one required computer node is needed for the authentication process, two secrets may be generated for generating the digital signature. If two required computer nodes are needed for the authentication process, three secrets may be generated for generating the digital signature. One of the secrets (e.g., a shared secret) may be divided into multiple portions to generate shares associated with the secret. The shares may be distributed among the computer nodes used for the authentication process, excluding the required nodes. The remaining secret(s) (the unshared secret(s) may be distributed to the required node(s). Thus, each required node may be in possession of a respective unshared secret, while each remaining computer node may be in possession of a share associated with the shared secret.

In some embodiments, the secrets may be generated such that computations (e.g., a set of sequential computations) performed based on all of the generated secrets are required in order to produce a correct output (e.g., a digital signature for the user account). For example, if two secrets are generated (due to a one required node requirement), a sequential computation that includes a first computation based on a first of the two secrets and a second computation based on a second of the two secrets (where the second computation may be further based on an output of the first computation) may be required to generate the digital signature of the user account. In this example, the first secret may be divided and shared among the computer nodes excluding the required node, and the second secret may be provided to the required node. Furthermore, the shares (which include portions of the secret) are generated and distributed among the remaining computer nodes such that not all of the shares, but at least a required number t of shares, are required to re-generate the shared secret (e.g., the first secret).

Figure 3:
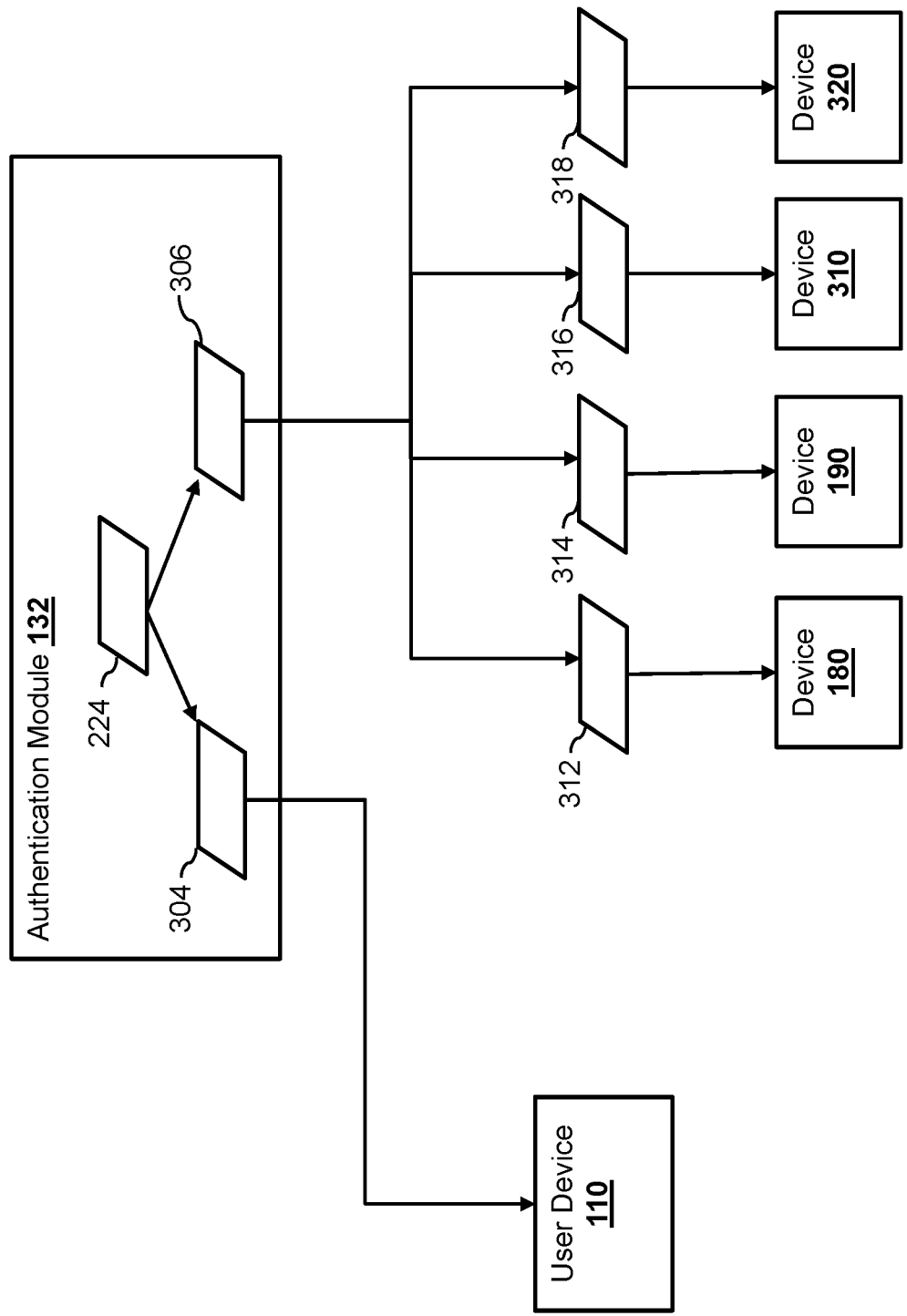
FIG. 3 illustrates distributing of secrets and shares of a secret among a set of computer nodes according to an embodiment of the present disclosure.

FIG. 3 illustrates how secret(s) and shares associated with a secret can be generated and distributed among a set of computer nodes associated with an authentication process of a user account according to some embodiments of the disclosure. In this example, the authentication manager 202 may determine that the set of computer nodes for authenticating transactions conducted through the user account include the user device 110 associated with the user 140 of the user account, and devices 180, 190, 310, and 320. The devices 180, 190, 310, and 320 may include at least one of the service provider server 130, the merchant server 120, another user device associated with the user 140, a user device that is not associated with the user 140, or a third-party device associated with a third-party entity. The authentication manager 202 may determine, based on a risk profile of the user account, that at least three computer nodes from this set of computer nodes are required to perform the authentication process in order to authenticate transactions conducted through the user account. Furthermore, in this example, the authentication manager 202 may designate the user device 110 as a required node for the authentication process of the user account such that in addition to having a quorum (e.g., three participating nodes in the authentication process), the user device 110 must be part of the authentication process to authenticate a transaction conducted through the user account.

As shown in the figure, since one required node is designated for the user account, the secrets generation module 206 of the authentication module 132 may generate two secrets 304 and 306 based on the private key 224 of the user account. Each of the secrets 304 and 306 may include a string, which can be an encryption key or data that can be used by an authentication module (e.g., the authentication module 116, the authentication 186, the authentication 196, etc.) to perform computations associated with the authentication process, which will be explained in more detail below. In some embodiments, the two secrets 304 and 306 generated based on the private key 224 are not reversible, meaning that the private key 224 cannot be re-generated from the secrets 304 and 306. However, the secrets 304 and 306 may be used in a set of computations (the authentication process), performed by the set of computer nodes in collaboration, to mimic a function of signing (e.g., encrypting) a piece of data using the private key 224. The set of computations may include a first computation based on the secret 306 (e.g., performing a first manipulation on a piece of data using the secret 306 to generate a first output) and a second computation based on the secret 304 (e.g., performing a second manipulation on the first output based on the secret 304 to generate a second output). The second output may correspond to a digital signature of the user account (the second output is identical to encrypting the piece of data using the private key 224). Once the secrets 304 and 306 are generated, the authentication module 132 may discard the private key 224 (e.g., permanently removing the private key 224).

The secrets distribution module 208 may then distribute the secret 304 to the required node (e.g., the authentication module 116 of the user device 110). In response to receiving the secret 304 from the authentication module 132, the authentication application 116 may securely store the secret 304 on the user device 110 (e.g., a persistent data storage such as a hard drive, a flash drive, etc.).

In some embodiments, the secrets generation module 206 may generate shares associated with the secret 306. Each share may include one or more portions of the secret 306, or information that may be used with other shares to re-generate the secret 306. The shares may be distributed among the remaining computer nodes 180, 190, 310, and 320. For example, the secrets generation module 206 may generate shares 312, 314, 316, and 318 for the computer nodes 180, 190, 310, and 320. The secrets generation module 206 may distribute the shares 312, 314, 316, and 318 to the devices 180, 190, 310, and 320, respectively. In some embodiments, the secrets generation module 206 may generate shares by dividing the secret 306 into multiple parts, where each share includes one or more portions of the secret 306. For example, the secrets generation module 206 may generate the shares 312-318 such that each share includes multiple portions (but not all portions) of the secret 306 such that each computer node does not possess the entirety of the secret 306. Furthermore, different shares may include different sets of multiple portions such that a portion of the computer nodes 180, 190, 310, and 312 (but not all of the computer nodes) are needed to have all of the parts of the secret 306. In some embodiments, the shares can be generated based on Shamir's secret sharing techniques, where the secret 306 may be transformed into a polynomial and each share includes a distinct data point (having a set of coordinates) of the polynomial. In some embodiments where the secret 306 is transformed into a polynomial, the secret 306 may be implemented as an offset to the polynomial.

Upon receiving the corresponding shares 312-318, the authentication module of the devices 180, 190, 310, and 312 may store the corresponding shares 312-318 on the devices 180, 190, 310, and 312. After distributing the secret 304 and the shares 312-318 of the secret 306, the set of computer nodes (e.g., the user device 110, the devices 180, 190, 310, and 312) are ready to perform the authentication process to authenticate transactions conducted through the user account of the user 140. In some embodiments, after distributing the secret 304 and the shares 312-318, the authentication module 132 may also discard (delete or otherwise destroy) copies of the secret 304 and the shares 312-318 from its memory.

Figure 4:
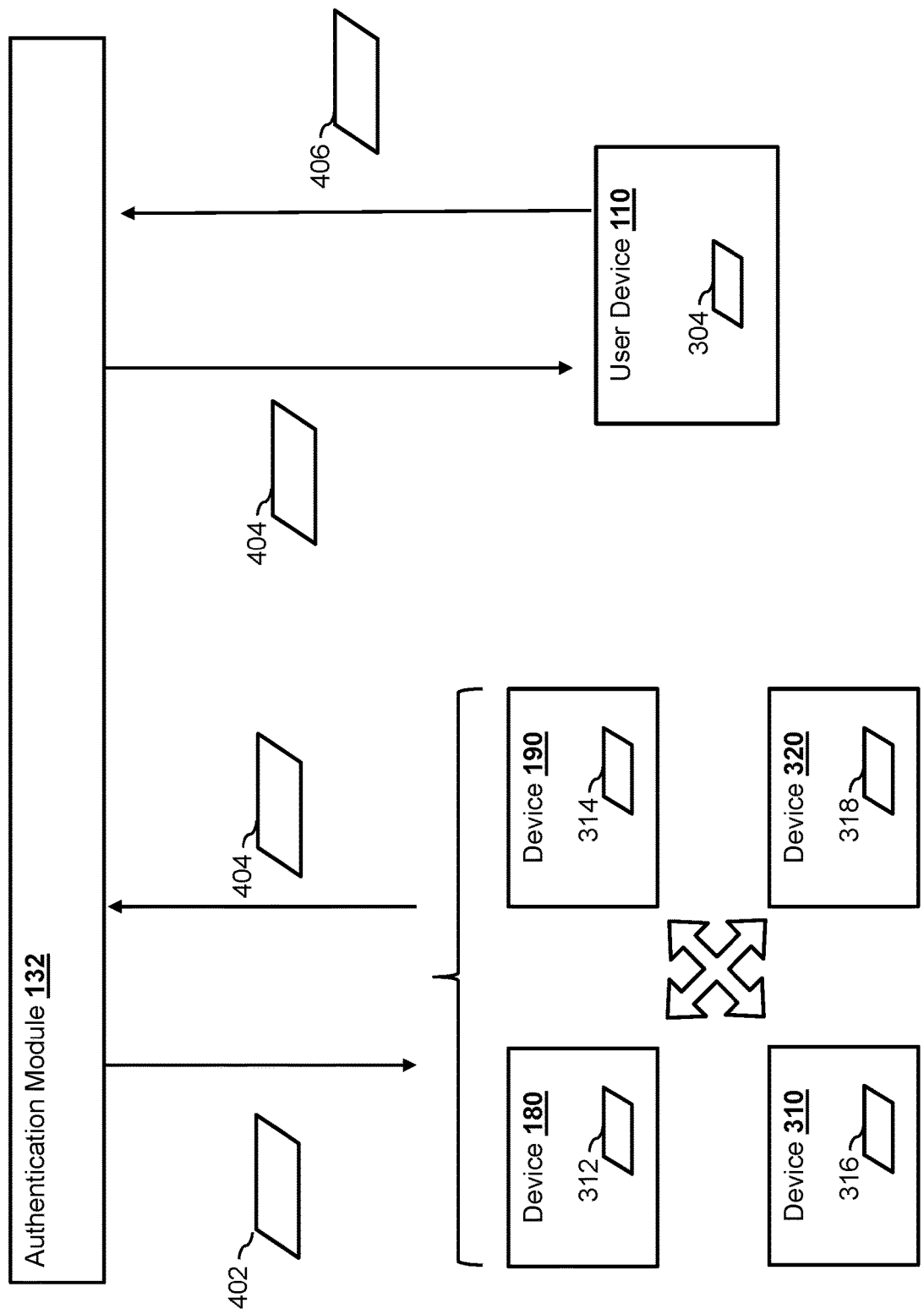
FIG. 4 illustrates interactions among a set of computer nodes for performing an authentication process according to an embodiment of the present disclosure.

FIG. 4 illustrates the authentication process performed by the set of computer nodes to authenticate a transaction conducted through the user account according to some embodiments of the disclosure. In some embodiments, the user 140 may use the user device 110 to initiate a transaction with the service provider server 130. The transaction may be a payment transaction (e.g., a purchase of an item from a merchant), a cryptocurrency transaction (e.g., transferring an amount of cryptocurrency from one wallet to another wallet, etc.), a data access transaction, or any type of transactions. In some embodiments, the user 140 may transmit a transaction request to the service provider server 130. The transaction request may include credentials (e.g., a user name, a password, etc.) associated with the user account. Upon verifying the credentials, the service provider server 130 may determine a set of computer nodes for authenticating transactions conducted through the user account. As discussed herein, different user accounts may be associated with different sets of computer nodes for performing the corresponding authentication process. For example, the authentication manager 202 may determine that the set of computer nodes, including the user device 110, the devices 180, 190, 310, and 312, is associated with the user account of the user 140.

In addition, since the order of performing the authentication process may be different for the required nodes, the authentication manager 202 may also determine, among the set of computer nodes associated with the user account, which computer node(s) are required nodes that must be included in the authentication process. In this example, the authentication manager 202 may determine that the user device 110 is the only required node for the user account.

The verification module 210 may first generate data 402 (also referred to as a message) for the authentication process. The data 402 may include information associated with the transaction (e.g., an identifier of the user account, an identifier of the recipient or the merchant, an amount being transferred, a transaction identifier, etc.). The data 402 may be used during the authentication process for authenticating the transaction (e.g., being manipulated by the set of computer nodes). Thus, upon determining that the user device 110 is the sole required node for authenticating the user account, the verification module 210 may transmit a first authentication request to the remaining computer nodes (e.g., the devices 180, 190, 310, and 312). In some embodiments, the verification module 210 may broadcast the authentication request (with the data 402) to the devices 180, 190, 310, and 312.

In some embodiments, the authentication process includes an ordered sequential set of computations, where the set of computations must be performed in order based on the secrets and/or the portions of the secrets. Thus, the secrets and/or the portions of the secrets distributed to the set of computer nodes may be labeled (e.g., based on the order). When the devices 180, 190, 310, and 312 (or the authentication application executed on the devices) receives the authentication request, each of the devices may determine if the device can perform the initial computation (e.g., an initial authentication routine that is part of the authentication process) based on a first portion of the secret 306 on the device. If the device determines that it can perform the initial computation based on the first portion of the secret 306 in its possession (the first portion is included in the corresponding share stored on the device), the device may perform the initial computation based on the data 402 and the first portion of the secret 306 (labeled as the first portion) within its corresponding share. The performing of the initial computation may manipulate the data 402 based on the first portion of the secret 306 and generate a first output. The device may broadcast the first output to other computer nodes. Each of the computer nodes may determine if it is capable of performing a second computation (e.g., a second authentication routine that is part of the authentication process) based on a second portion of the secret 306. If a device determines that it can perform the second computation based on the second portion of the secret 360 in its possession (the second portion included in a corresponding share stored on the device), it may perform the second computation. The second computation may involve manipulating the first output using the second portion of the secret 306. The devices 180, 190, 310, and 312 may continue to perform computations as part of the authentication process using portions of the secret 306 in their possessions until all of the computations involving the secret 306 is completed. The last computation may generate the output 404. When all of the computations involving the secret 306 is completed, the device that performed the last computation may transmit the output 404 back to the authentication module 132. In some embodiments, instead of transmitting the output 404 to the authentication module 132, the device that performed the last computation may transmit the output 404 directly to the user deice 110 if the devices have knowledge of the identity of the required nodes.

The verification module 210 may then transmit a second authentication request to the required node (e.g., the user device 110). The second authentication request may include the output 404 generated by the devices 180, 190, 310, and 312. Upon receiving the second authentication request, the authentication module 116 of the user device 110 may perform a computation corresponding to the authentication process based on the secret 304 stored on the user device 110. In some embodiments, the computation performed by the authentication module 116 further manipulates the output 404 based on the secret 304 to generate an output 406, which is the final output of the authentication process. The authentication module 116 may then transmit the output 406 to the authentication module 132.

As discussed herein, the output 406 of the authentication process should mimic a digital signature of the user account that is generated by encrypting data (e.g., the data 402) using the private key 224 of the user account. Thus, in some embodiments, the verification module 210 may verify the output 406 using the public key 222 of the user account. For example, the verification module 210 may use the public key 222 to decrypt the output 406. The verification module 210 may then compare the decrypted data (from decrypting the output 406 using the public key 222) and the data 402, and may verify the output 406 if they match.

In some embodiments, the authentication manager 202 may send a signal to the other module or application (e.g., the service application 138, etc.) indicating that the authentication process is successful if the output 406 is verified, or may send an error to the other module or application indicating that the authentication process is unsuccessful if the output 406 is not verified. In some embodiments, the service application 138 may attach the output 406 to a transaction record and store the transaction record in a data structure for recording, such as the account database 136. If the transaction is a cryptocurrency transaction, the service application 138 may broadcast the transaction (including the output 406 as the digital signature of the user account) to the distributed servers that store and manager the public ledgers (e.g., the blockchain for the cryptocurrency).

Figure 5:
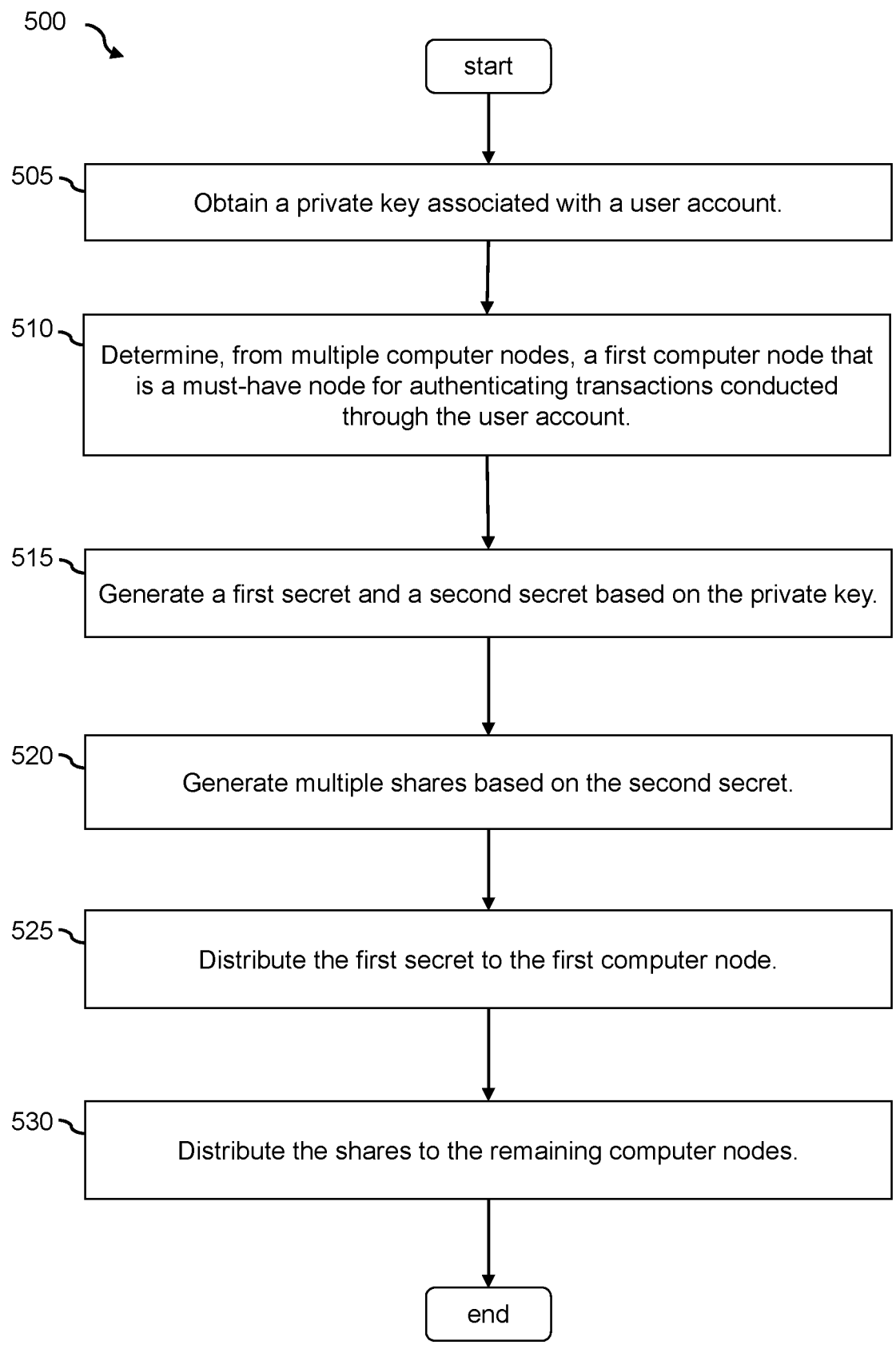
FIG. 5 is a flowchart showing a process of generating and distributing secrets according to an embodiment of the present disclosure.

FIG. 5 illustrates a process 500 for generating and distributing secrets according to various embodiments of the disclosure. In some embodiments, at least a portion of the process 500 may be performed by the authentication module 132. The process 500 may begin by obtaining (at step 505) a private key associated with a user account. For example, the authentication manager 202 may generate (or otherwise obtain) a public key and private key pair for the user account using an asymmetrical cryptography technique.

The process 500 determines (at step 510), from multiple computer nodes, a first computer node that is a required node for authenticating transactions conducted through the user account. In some embodiments, the authentication module 132 may determine a set of computer nodes (n nodes) for performing the authentication process for the user account. Based on the security and resiliency requirements, the authentication module 132 may determine that only a portion of the set of computer nodes (t out of the n nodes) are required to participate in the authentication process to authenticate a transaction. To further enhance the security of the authentication process, the authentication module 132 may determine one or more required node(s) for the authentication process associated with the user account. The required node(s) are computer devices that are needed to participate in the authentication process in order to authenticate a transaction. For example, the authentication module 132 may determine that one of the devices (e.g., the user device 110) is a required node for authenticating transactions conducted through the user account.

The process 500 then generates (at step 515) a first secret and a second secret based on the private key. Based on the number of required nodes determined for the user account, the authentication module 132 may generate a corresponding number of secrets (e.g., one more than the number of required nodes). Since only one required node is determined for the user account of the user 140 in this example, the authentication module 132 may generate two secrets based on the private key of the user account. The two secrets are generated such that both of them are required during a performance of a set of computations that generates an output that mimics a digital signature for the user account (e.g., data that is encrypted using the private key of the user account).

The process 500 then generates (at step 520) multiple shares or portions based on the second secret. For example, the authentication module 132 may determine that there are n number of nodes involved in the authentication process for the user account, where one of them is a required node. The authentication module 132 may then generate n−1 number of shares based on the second secret, such that the shares may be distributed among the remaining nodes for the user account.

The process 500 distributes (at step 525) the first secret to the first computer node and distributes (at step 530) the shares to the remaining computer nodes. For example, the authentication module 132 may distribute the secret 304 to the user device 110, and may distribute the shares 312-318 to the remaining computer nodes (e.g., the devices 180, 190, 310, and 312). In some embodiments, instead of generating the secret keys centrally by the authentication module 132 and then distributed to the authentication applications, each authentication application corresponding to a device may be configured to generate its own key (or its own share of keys).

Figure 6:
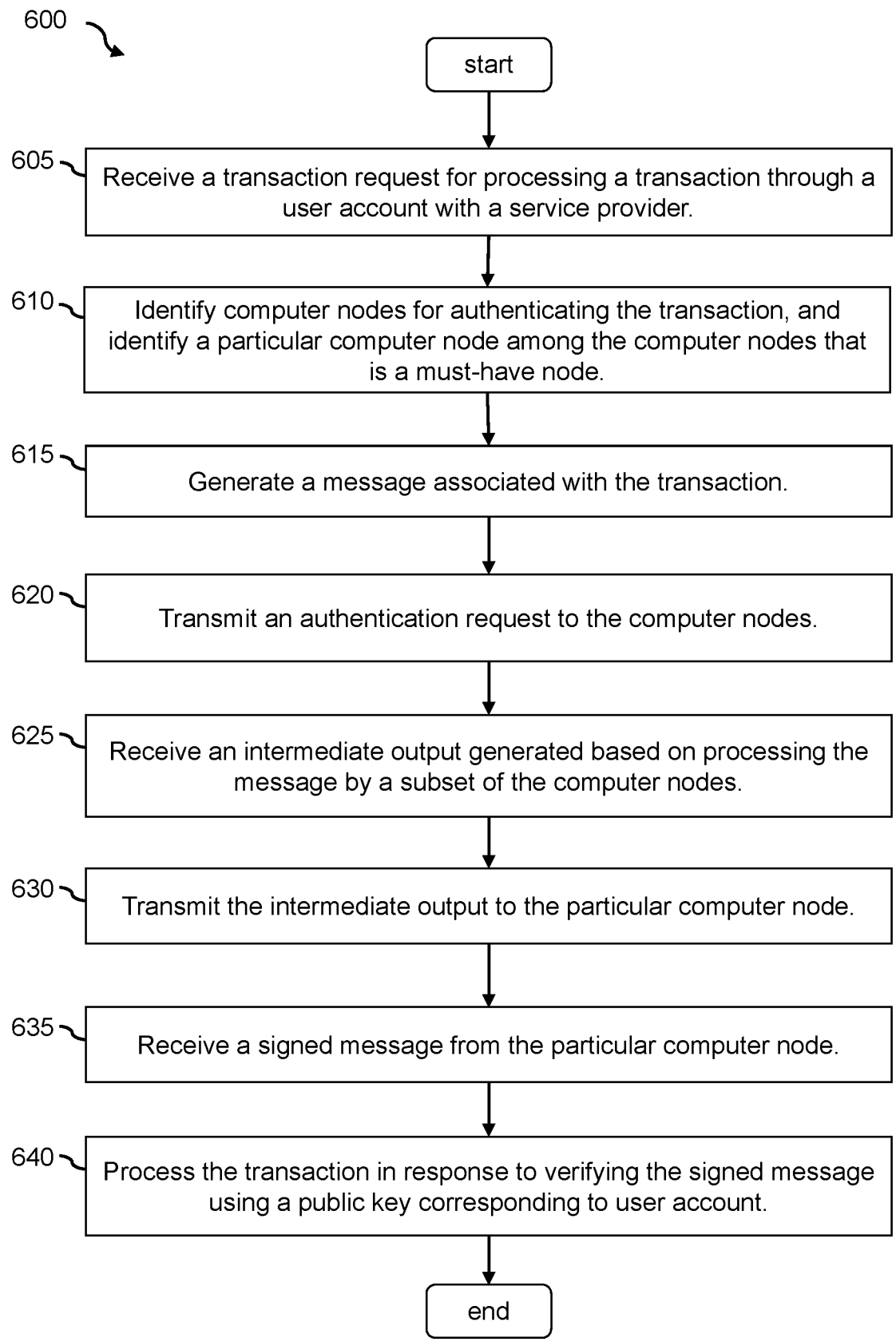
FIG. 6 is a flowchart showing a process of performing an authentication process according to an embodiment of the present disclosure.

FIG. 6 illustrates a process 600 for performing an authentication process for a user account according to various embodiments of the disclosure. In some embodiments, at least a portion of the process 600 may be performed by the authentication module 132. The process 600 may begin by receiving (at step 605) a transaction request for processing a transaction through a user account with a service provider. For example, the user 140 may, via the user interface application 112 of the user device 110, transmits a transaction request to the service provider server 130. The transaction request may be a request for performing a payment transaction, a data access transaction, a cryptocurrency transaction or any other types of transaction through the user account of the user 140.

The process 600 then identifies (at step 610) computer nodes for authenticating the transaction, and identifies a particular computer node among the computer nodes that is a must-have node. For example, the authentication module 132 may identify a set of computer nodes, including the user device 110, the device 180, the device 190, the device 310, and the device 312, for authenticating the transaction conducted through the user account. The authentication module 132 may also identify, among the set of computer nodes, that the user device 110 is a required device for performing the authentication process.

The process 600 generates (at step 615) a message associated with the transaction and transmits (at step 620) an authentication request to the set of computer nodes. For example, the authentication module 132 may generate a message based on information associated with the transaction and/or the user account. The message may include a transaction identifier, an identifier of the user account, an identifier of a recipient, an amount of the transaction, and/or other information. The authentication module 132 may then transmit an authentication request, along with the message, to the set of computer nodes.

Based on the message, at least a portion of the set of computer nodes (a subset of computer nodes) may perform a set of computations corresponding to the authentication process. The transaction can be authenticated if the subset of computer nodes and the required node satisfy the quorum requirement. The set of computations may be an ordered list of computations based on an order associated with the shares and the secret. The subset of computer nodes (or the authentication applications associated with the computer nodes) may have knowledge of the order based on the shares and/or the secret in their possession and may be configured to perform the set of computations in the order. For example, a first node may perform a first computation using the message and the share in its possession to generate a first output, and may pass the first output to other nodes in the set of computer nodes. A second node may perform a second computation using the first output and the share in its possession to generate a second output, and may pass the second output to other nodes in the set of computer nodes. The subset of computer nodes may continue to perform computations corresponding to the authentication process until it is completed (e.g., all of the secret and the shares of secret have been used in the computations). The subset of computer nodes may generate an intermediate output (e.g., the output 404) after completing the computations, and may send the intermediate output 404 to the authentication module 132. Thus, the process 600 receives (at step 625) an intermediate output generated based on processing the message by a subset of the computer nodes.

The process 600 then transmits (at step 630) the intermediate output to the particular computer node and receives (at step 635) a signed message from the particular computer node. For example, the authentication module 132 may transmit the intermediate output 404 to the user device 110 (e.g., the required node) for further processing. The user device 110 may process the intermediate output 404 using the secret 304 in its possession to generate an output 406 and generate an output 406. In some embodiments, the output 406 mimics a signed message that is signed using the private key of the user account. The user device 110 may transmit the output 406 to the authentication module 132.

The process 600 then processes (at step 640) the transaction in response to verifying the signed message using a public key corresponding to the user account. For example, the authentication module 132 may verify the signed message by decrypting the signed message using the public key of the user account. The authentication module 132 may compare the decrypted message against the original message, and may determine that the signed message is verified when they match. Once it is determined that the signed message is verified, the authentication module 132 may transmit a signal to the service application 138 that causes the service application 138 to process the transaction.

Figure 7:
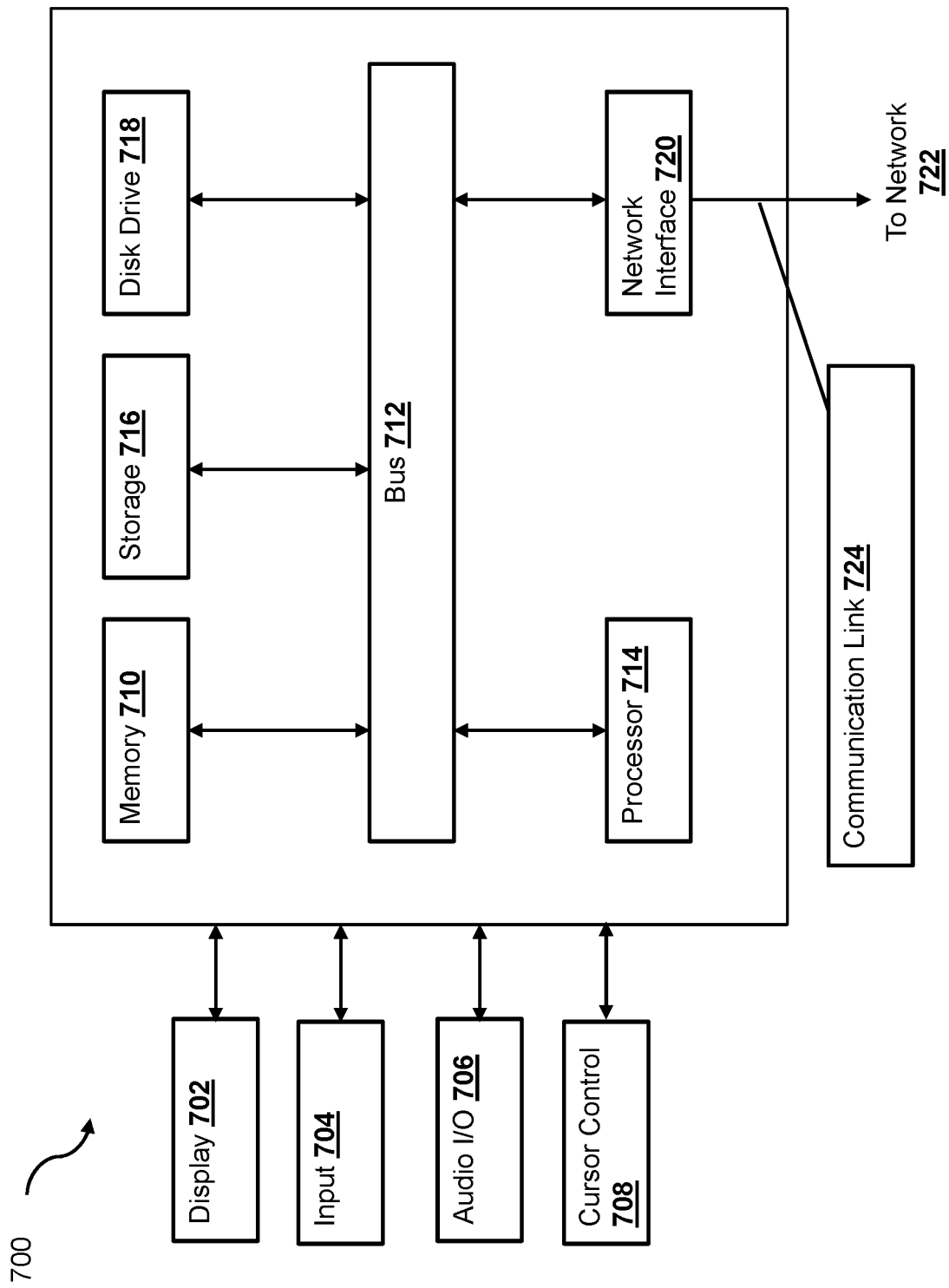
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the merchant server 120, and the user device 110, and devices 180, 190, 310, and 312. In various implementations, the user device 110, and other user devices may include a mobile cellular phone, personal computer (PC), laptop, wearable computing device, etc. adapted for wireless communication, and each of the service provider server 130 and the merchant server 120 (and other servers such as third-party servers) may include a network computing device, such as a server. Thus, it should be appreciated that the devices/servers 110, 120, 130, 180, 190, 310, and 312 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via a network 722, such as network 160 of FIG. 1. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the authentication functionalities described herein according to the processes 500 and 600.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
obtaining a private key associated with a user account;
generating a first secret and a second secret based on the private key, wherein a computational transformation of an electronic message using the first secret and the second secret mimics an electronic signing of the electronic message using the private key;
generating a plurality of shares based on the second secret, wherein the plurality of shares comprises a first number of shares, and wherein a second number, that is smaller than the first number, of shares from the plurality of shares is required to recover the second secret; and
distributing the first secret and the plurality of shares to a plurality of computer nodes, wherein the first secret is distributed to a first computer node of the plurality of computer nodes.

2. The system of claim 1, wherein the operations further comprise:
identifying, from the plurality of computer nodes, the first computer node as a required computer node for performing an authentication process for authenticating transactions conducted through the user account.

3. The system of claim 2, wherein the operations further comprise:
  determining locations associated with the plurality of computer nodes, wherein the first computer node is identified as the required computer node based on the locations associated with the plurality of computer nodes.

4. The system of claim 2, wherein the operations further comprise:
  determining one or more device identifiers of user devices associated with the user account, wherein the first computer node is identified as the required computer node based on the one or more device identifiers.

5. The system of claim 2, wherein the operations further comprise:
  determining security configurations of the plurality of computer nodes, wherein the first computer node is identified as the required computer node based on the security configurations of the plurality of computer nodes.

6. The system of claim 1, wherein the operations further comprise:
  receiving a request for processing a transaction through the user account;
  generating a message for the transaction request; and
  transmitting the message to the plurality of computer nodes for processing the message, wherein the processing of the message is performed by (i) a subset of the plurality of computer nodes, excluding the first computer node, exceeding or equal to the second number using corresponding shares and (ii) the first computer node using the first secret, and wherein the processing of the message further generates a signed message.

7. The system of claim 6, wherein the operations further comprise:
  receiving the signed message from at least one of the plurality of computer nodes; and
  determining whether the signed message is verified using a public key corresponding to the user account.

8. The system of claim 6, wherein the processing the message comprises performing a plurality of sequential mathematical transformations on the message using a subset of the plurality of shares and the first secret.

9. The system of claim 6, wherein the operations further comprise:
  processing the transaction through the user account when the signed message is verified or denying the transaction when the signed message is not verified.

10. A method comprising:
  receiving, by one or more hardware processors, a request for performing a transaction through a user account;
  generating, by the one or more hardware processors, a message for the transaction request;
  identifying, by the one or more hardware processors, a plurality of computer nodes associated with an authentication process of the user account, wherein the plurality of computer nodes comprises a first computer node having a first secret and a subset of the plurality of computer nodes having shares associated with a second secret, wherein the first secret and the second secret are usable to generate data that mimics a digital signature of the user account;
  transmitting, by the one or more hardware processors, the message to the plurality of computer nodes for performing an authentication process corresponding to the user account, wherein the authentication process transforms the message to a signed message based on the first secret and at least a portion of the shares associated with the second secret;
  verifying, by the one or more hardware processors, the signed message using a public key associated with the user account; and
  performing, by the one or more hardware processors, the transaction in response to verifying the signed message.

11. The method of claim 10, wherein the verifying comprises:
  decrypting the signed message using the public key; and
  comparing the decrypted message against the message, wherein the signed message is verified in response to determining that the decrypted message matches the message.

12. The method of claim 10, wherein the transaction is a cryptocurrency transaction, and wherein the performing the transaction comprises:
  generating a block comprising the signed message; and
  appending the block to a public ledger associated with the cryptocurrency.

13. The method of claim 10, wherein the transaction is a payment transaction, and wherein the performing the transaction comprises transmitting the signed message to a recipient device of the transaction.

14. The method of claim 10, wherein a portion of the plurality of computer nodes, including the first computer node, is configured to perform an ordered list of computation using the first secret and corresponding shares of the second secret.

15. A non-transitory machine-readable medium having stored thereon machine-readable instructions executable to cause a machine to perform operations comprising:
  obtaining a private key associated with a user account;
  generating a first secret and a second secret based on the private key, wherein a computational transformation of an electronic message using the first secret and the second secret mimics an electronic signing of the electronic message using the private key;
  generating a plurality of shares based on the second secret, wherein the plurality of shares comprises a first number of shares, and wherein a second number, that is smaller than the first number, of shares from the plurality of shares is required to recover the second secret; and
  distributing the first secret and the plurality of shares to a plurality of computer nodes, wherein the first secret is distributed to a first computer node of the plurality of computer nodes.

16. The non-transitory machine-readable medium of claim 15, wherein the operations further comprise:
  determining the first number and the second number for the user account based on a risk profile of the user account.

17. The non-transitory machine-readable medium of claim 15, wherein the operations further comprise:
  generating a polynomial based on the second secret, wherein the polynomial has a number of degrees that is smaller than the second number by one, and wherein the plurality of shares is generated based on the polynomial.

18. The non-transitory machine-readable medium of claim 17, wherein each share of the plurality of shares comprises a set of coordinates associated with a data point of the polynomial.

19. The non-transitory machine-readable medium of claim 17, wherein the first secret comprises an offset associated with the polynomial.

20. The non-transitory machine-readable medium of claim 15, wherein the operations further comprise:
   identifying, from the plurality of computer nodes, the first computer node as a required computer node for performing an authentication process for authenticating transactions conducted through the user account.

* * * * *